(12) United States Patent
Vassbotten et al.

(10) Patent No.: US 8,490,568 B2
(45) Date of Patent: Jul. 23, 2013

(54) VESSEL FOR CONTAGIOUS FISH DISEASE CONTROL

(75) Inventors: Alex Vassbotten, Eikefjord (NO); Gunnar Stavøstrand, Svanøybukt (NO)

(73) Assignee: Havsterk AS, Eikefjord (NO)

( * ) Notice: Subject to any disclaimer, the term of this patent is extended or adjusted under 35 U.S.C. 154(b) by 225 days.

(21) Appl. No.: 13/059,034

(22) PCT Filed: Aug. 14, 2009

(86) PCT No.: PCT/NO2009/000289
§ 371 (c)(1),
(2), (4) Date: Apr. 11, 2011

(87) PCT Pub. No.: WO2010/019053
PCT Pub. Date: Feb. 18, 2010

(65) Prior Publication Data
US 2011/0192337 A1    Aug. 11, 2011

(30) Foreign Application Priority Data
Aug. 14, 2008   (NO) .................................. 20083538

(51) Int. Cl.
B63B 35/14   (2006.01)
(52) U.S. Cl.
USPC .......................................... 114/255; 119/202

(58) Field of Classification Search
USPC ....... 114/255; 119/202; 71/10, 11, 16; 426/7; 43/4.5, 6.5, 8
See application file for complete search history.

(56) References Cited

U.S. PATENT DOCUMENTS

| | | | |
|---|---|---|---|
| 3,316,830 A | | 5/1967 | Biehl |
| 3,938,274 A | * | 2/1976 | Seymour ...................... 114/255 |
| 4,975,106 A | * | 12/1990 | Ferguson ......................... 71/10 |
| 5,076,504 A | | 12/1991 | Young |
| 5,713,788 A | | 2/1998 | Ferket et al. |

FOREIGN PATENT DOCUMENTS

| | | |
|---|---|---|
| EP | 1 520 479 A2 | 4/2005 |
| KR | 10-2004-0044286 A | 5/2004 |
| WO | WO 87/04051 A1 | 7/1987 |

* cited by examiner

*Primary Examiner* — Lars A Olson
(74) *Attorney, Agent, or Firm* — Birch, Stewart, Kolasch & Birch, LLP (57) ABSTRACT

The present invention relates to a vessel for handling of contagious or dead fish comprising: a hull with a generally closed deck (5), and an inlet (15) for receiving the fish externally to a fish grinder (11) arranged for grinding the fish through the grinder (11) and arranged for delivering ground fish mass to a closed, internal grinder tank (8) in the vessel, the grinder tank (8) arranged for receiving ensiling liquid from a chemical dosing plant (12) to the ground fish mass. In the vessel according to the invention the dosing plant (12) may be arranged for dosing ensiling liquid into the ground mass proportional to the amount of fish supplied to the grinder tank (8).

14 Claims, 8 Drawing Sheets

Fig. 1

Fig. 4
Sect. C-C in Fig. 1

As seen from bow
Sect. D-D in Fig. 1

Fig. 5

Fig. 6
Sect. E-E in Fig. 1

Fig. 6b
simplified Sect. E-E in Fig. 1

VESSEL FOR CONTAGIOUS FISH DISEASE CONTROL

INTRODUCTION

The present invention relates to a vessel for handling contagious or dead fish for the purpose of disease control. More specifically, the invention is a vessel, i.e. a floating unit such as a barge or ship for handling of dead or infected fish in a hygienic and a contagious disease preventing way. More specifically it relates to a barge with a grinder device for infectious or dead fish, wherein the grinder device is followed by units for chemical treatment, such as ensiling, and further storage of the so treated mass in a proper way. The vessel according to the present invention may used for the purpose of receiving and handling dead or infectious fish from a fish farm or a fishing vessel or a fish carrier and converting the fish to ground and disinfected fish mass which may constitute a source for further conversion to animal or fish feed.

BACKGROUND OF THE INVENTION

Handling of dead fish is an imperative and important part of the daily routine at the fishing farms. The increasingly large constructions with 2-5000 tons of farmed biomass per location produces considerable amount of dead fish even during normal conditions. Removal of dead fish as quick as possible is crucial for reducing contaminations and risk of infections. The mortality rate in a fishing farm producing 4000 tons of mass may be as low as 1-2% per year, however it corresponds to 40-80 tons of dead fish per year. The clinical picture today with the spreading of fish diseases like PD (Pancreas Disease) and VHS (Viral Hemorrhagic Septicemia) provides an order to attend the risk that a mortality rate at between 50% and 70% in a generation may occur. During a disease outbreak in a part of the fish farm an imminent danger exists of infecting the remaining fish in the whole fishing farm. Depending on weather and wind and current condition may infectious fish constitute a risk of infection for every nearby fishing farm. As of today there are no proper systems with a capacity sufficient to handle large amounts of dead fish in rational way. Dead fish is loaded on minor working boats in trunks on board and transported to land where the trunks are unloaded to grinder tanks with varying capacity for grinding and adding of acid, for subsequently being pumped further to larger storage tanks. Working boats, their equipment and tanks may carry infection and contribute to spreading the infection on the way between the infected fish cage containing the dead or infectious fish, and the collecting or handling location on land. Under normal circumstances with a low mortality rate handling of dead fish is part of the daily routine work at fishing farms, but by a larger disease outbreak suddenly the workload is extremely huge and this may have impact on other tasks and the disease outbreak may easily turn to be prohibitively huge. Without effort over time the amounts of dead fish in net cages have tendency to accumulate, which is undesirable in many aspects, with regard to lacking of registration of the biomass, and increased risk of infection. If the dead fish is handled too late, it will constitute a poor raw material for ensiling. Handling of dead fish in large quantities may also incur an unpleasant and hard additional strain for the crew.

The vessel according to the present invention solves a number of problems related to handling of dead fish. The barge has a relatively small and easy cleaned surface of the deck and exposed surface of the equipment on the deck. The fish is brought to the inlet in that the barge is towed to the infected location and the dead fish is brought from the net cage up to the inlet funnel. The fish is immediately ground in the inlet arranged right after the funnel. The ground fish mass will thus pass the grinder device only once in contrast to traditional grinder pumps which generally must to run the mass several times through to make sure that all not yet ground rest materials are eventually ground. The ground mass after grinding is sent to the desired chemical treatment process, such as ensiling. The so chemically treated mass is stored in tanks until the mass in the tanks is pumped out and transported away in non-infectious condition. The barge according to the invention for treatment of dead fish is a compact and highly efficient device with vast capacity which will improve handling of dead fish, and may simplify the task of the fish farmers when considerable amounts of dead fish must be handled.

BACKGROUND ART

U.S. Pat. No. 5,713,788 (Ferket), 1996 describes a mobile grinder mainly made for use on land and made for grinding of poultry and swine. The grinder grinds animal carcasses for further processing of the ground mass. The grinder is installed between a funnel for throwing in of animal carcasses and an outlet for ground mass. The whole device is arranged on a supporting frame on wheels. Ferket's apparatus is not connected with storage tanks and may by no means be used in marine handling of dead fish.

U.S. Pat. No. 3,316,830 (Biehl) 1965, describes a mobile unit for production of animal feeding stuff with different menu selections to ground biological waste which also may ensilied for preservation.

The above mentioned U.S. Pat. No. 5,713,788 to Ferket, 1996 and U.S. Pat. No. 3,316,830 to Biehl, 1965, are mainly designed for agricultural production and adapted for treating of waste products from the agricultural farming. The units require much space and may difficulty be adapted to a compact, floating and mobile maritime production. The patent publications mainly describe devices developed for light and slow production, and the equipments cannot be modified to or and scaled up for processing of large salmon without considerable redesign from their specific drawings. Existing devices for grinding and ensiling of dead fish used in different locations in Norway do not utilize elements from these patents in their constructions.

Traditional plants for treatment of dead fish are equipped with tanks with grinding pumps and dead fish grinders are provided with a non-controlled circulation in a tank, which during a given time will cut and circulate the mass to a thin, soup-similar ensiled mass. Such a device is believed to be less efficient than the present device according to the invention wherein all dead fish passes through a grinder immediately at the intake, and it may be a risk in the background art that some elements not being ground since not all mass is sent through the grinder in a controlled way. One may, based on the grinder pump tanks of the background art not be confidently sure of the occurrence of fishbone remnants or liquid fish fat escaping the grinder pump so that grinder pump must be run continuously over some considerable period of time compared to present invention in which the grinder is placed at the intake.

There is a need for a apparatus for grinding and handling of dead fish having efficiency, mobility and which is directly adapted the task of grinding dead fish, ensiling the mass and storage of the treated mass from dead fish from a fish farm. Such an efficient apparatus is important for providing a satisfactory emergency preparedness in case of major contagious disease invasions, in order to remove dead fish quickly and effectively, in order for reducing additional infection stress and also for meeting environmental, health and safety standard (EHS) requirements for crew.

BRIEF SUMMARY OF THE INVENTION

In one aspect, the above mentioned purpose is achieved using the device of the present invention which is a vessel for handling of contagious or dead fish comprising:
a hull with a generally closed deck (5),
an inlet (15) for receiving said fish externally to a fish grinder (11) arranged for grinding said fish through said grinder (11) and arranged for delivering ground fish mass to an internal grinder tank (8) in said vessel,
said grinder tank (8) arranged for receiving ensiling liquid from a chemical dosing plant (12) to said ground fish mass.

In a more specific, preferred embodiment of the invention, the vessel for handling of dead fish, comprises the following features:
a hull subdivided into bulkhead compartments and with a generally closed deck over the bulkhead compartments,
a funnel on the deck, said funnel arranged to be fed with dead fish and conduct said dead fish through a grinder, further to
a grinder tank arranged to receive the first ground mass from said grinder, said grinder tank and further arranged for temporary storage of said ground mass of dead fish,
said grinder tank provided with a chemical dosing plant for roughly estimated addition of ensiling liquid to said ground mass, and with a grinder tank pump for circulation of said ground mass in said grinder tank,
said grinder tank pump further arranged for pumping said ground, mixed mass together with ensiling liquid past to an ensiling tank,
said ensiling tank arranged to add additional ensiling liquid to said ground mass in order to adjust to a desired acidity,
said ensiling tank provided with an ensiling tank pump for circulating said ground mass in said ensiling tank,
said ensiling tank pump further arranged for pumping said acidity adjusted mass further to one or more storage tanks on board.

The vessel is a mobile floating vessel unit with a grinder assembled directly on the inlet for dead or contagious fish, and in which the ground mass is led directly to an arrangement for ensiling of the ground mass, and in which the finished ensiled mass is passed to the storage tanks on board in the barge.

In another aspect the invention is expressed as a method for handling contagious or dead fish comprising:
feeding said fish from an external source through an inlet (15) in a vessel to a grinder (11) grinding said fish to ground fish mass and delivering said ground fish mass to an internal grinder tank (8) in said vessel,
feeding ensiling liquid from a chemical dosing plant (12) to said ground fish mass in said grinder tank (8).

Further inventive and preferable steps are described in dependent claims 13 and onwards.

In the method defined above, all the fish is ground to fish mass during the first passage through the inlet grinder (11) into the vessel such as a barge or a ship, and the mass could not escape from of the unit before the mass is finished in the ensiling process, in this manner preventing infection to be brought out of the vessel. In the same way the area of the vessel to be disinfected is reduced to mainly comprise the deck and topside equipment together with the inlet and the grinder. Further may a vessel according to the present invention receive a even small amounts of dead fish and grind it quickly into the grinding tank where the ensiling liquid is roughly added, and with that preventing risk of infection and at the same time as undesired decomposition of the roughly ensiled mass is prevented from developing. In this way one may in several cases immediately obtain a roughly ensiled mass which does not have to be considered as a pollution, but which may utilized as an additive in animal feeding stuff. This will also apply to the ensiled mass in the main ensiling tank which is after adjusted to a desired degree of acidity and pumped to the tanks which is later transported to a receiving station for ensiled fish mass.

A vessel according to the present invention may in this way perform a function in fish farm as a collecting location for dead fish brought out from the net cages. The barge is adapted for being easily accessible regardless of number of crew with different types of working vessels calling at the vessel with fish, or a pump or conveyor belt directly from a net cage. The vessel according to the present invention may also be transported to a net cage plant, wherein an outbreak of disease may occur, in order to remove unusually large amounts of fish so as to prevent spreading of the contagious outbreak.

BRIEF FIGURE CAPTIONS

The invention is illustrated in the accompanying drawing figures only intended for illustrating the invention and which should in no way be construed as limiting the scope of the invention, said scope being limited solely by the claims.

DESCRIPTION OF AN EMBODIMENT ACCORDING TO THE INVENTION

Figure 1:
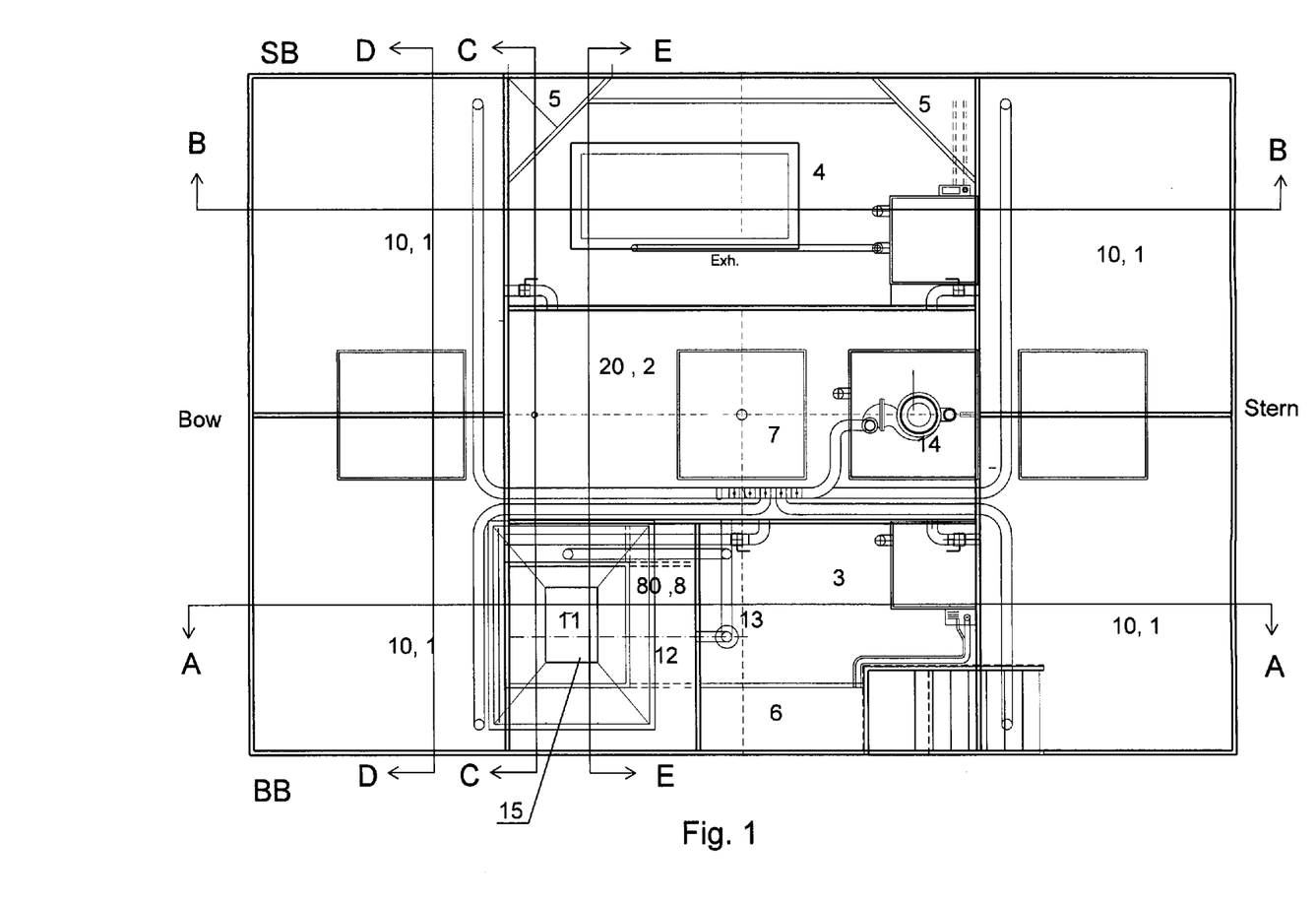
FIG. 1 is a plan view showing an embodiment of the vessel, here a barge, according to the invention with separating bulkheads for subdividing the vessel into chambers and tanks, with hatches for access, an inlet funnel with a main grinder, and pumps with accompanying piping arrangements.
Figures 1, 4:
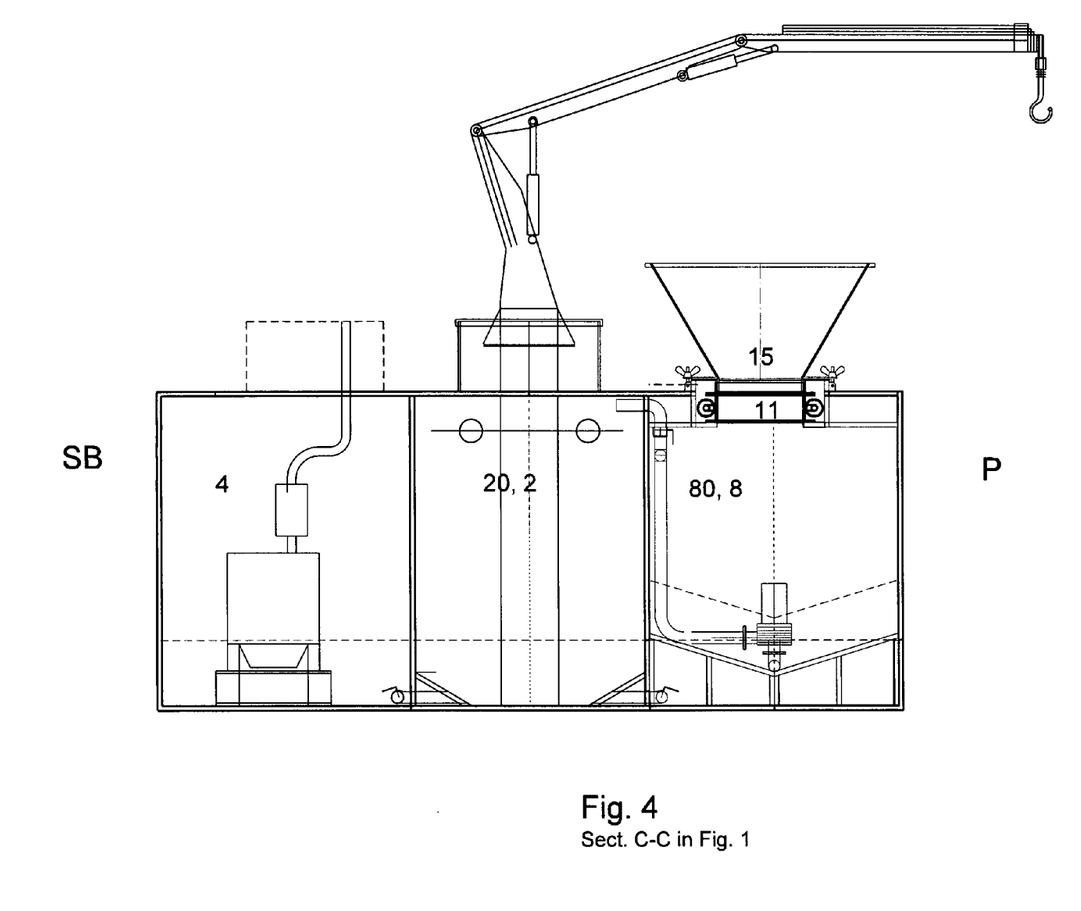
FIG. 4 shows a cross section view of the vessel along a line C-C in FIG. 1, in centre shown from the bow, showing the electrical generator room, ensiling tank and the funnel above the grinder and the grinder tank. In this cross section is shown a crane device arranged in the crane foundation on the deck.
Figure 2:
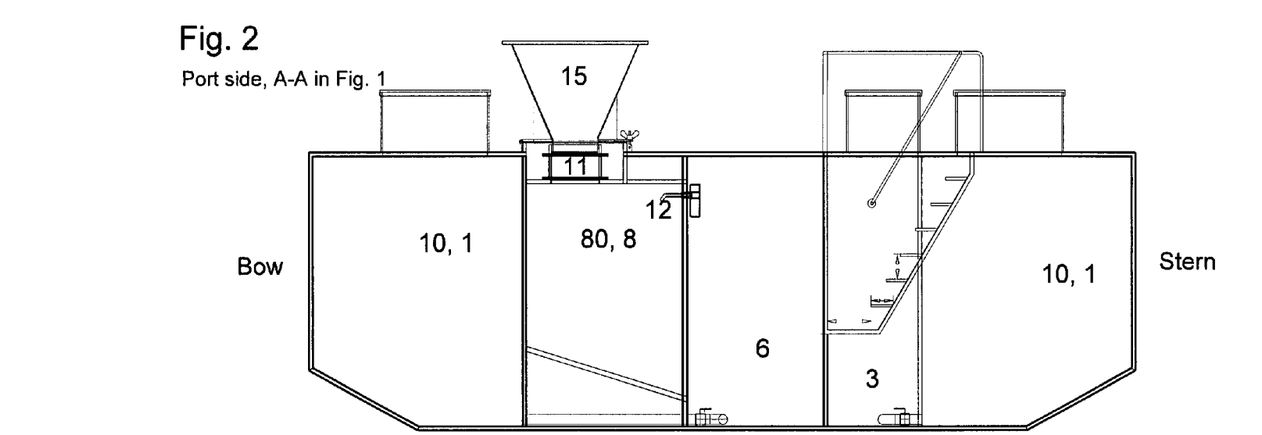
FIG. 2 shows a side elevation and partial section view of a port side of an embodiment of the vessel according to the invention. The section is along a line A-A indicated in FIG. 1. The vessel is shown from a port side, with storage tanks, grinder tank, water tank and in addition a ladder recess for facilitating access. The grinder and the funnel are shown in a lateral view. A chemical dosing plant for acid is also shown.

The dead fish may be loaded to the vessel by a crane or other suitable equipment whereby the fish is dropped into the inlet with the funnel (15) above the grinder (11) arranged to grind the fish, please see FIG. 1 and FIG. 2. The fish is ground in the grinder (11) into small pieces which fall down into the grinder tank (8), please see FIGS. 1, 2, 4 and 6, wherein at the same time ensiling acid is added to the ground mass in an roughly estimated adequate dosage adapted to the grinder capacity and the running time.

Thus the invention in a very simple embodiment may be expressed as a vessel for handling of contagious or dead fish comprising a hull with a generally closed deck (5), the inlet (15) arranged for receiving the fish externally to a fish grinder (11) arranged for grinding said fish through said grinder (11) and arranged for delivering ground fish mass to an internal grinder tank (8) in the vessel, with the grinder tank (8) arranged for receiving ensiling liquid from a chemical dosing plant (12) to said ground fish mass.

In a preferred embodiment of the invention the dosing plant (12) is arranged for dosing ensiling liquid into the ground mass proportional to the amount of fish supplied to the grinder tank (8). This will ensure that a generally sufficient required ensiling liquid is added to the ground fish mass sufficient to contain the contagiousness of the mass and to prevent undesired biological degradation of the ground fish mass. The fine adjustment of the ensiling liquid may be adjusted later, after measuring pH: insufficient acidity may be remedied by adding the exact required amount of ensiling liquid, while too strong acidity in the mass may be remedied by adding more ground fish.

In a further preferred embodiment of the invention a grinder tank pump (13) may be arranged for circulating said ground mass in said grinder tank (8).

Figure 6:
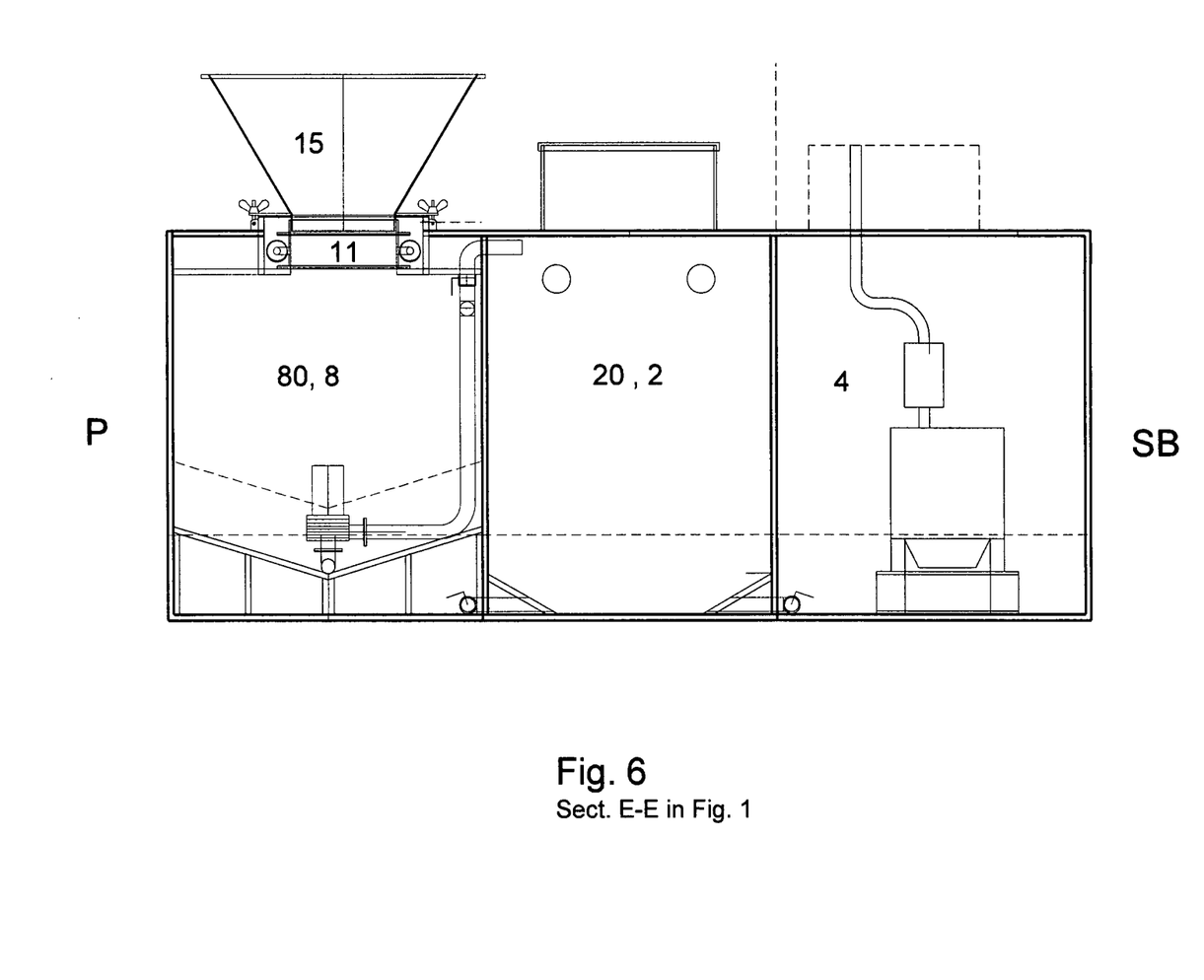
FIG. 6 shows a cross section and partial elevation view along the line E-E from FIG. 1 and shown from aft showing the electrical generator room on the starboard, the ensiling tank in the centre line and the funnel above the grinder and the grinding tank, together with a dry access pump for circulation and further pumping.
Figure 6B:
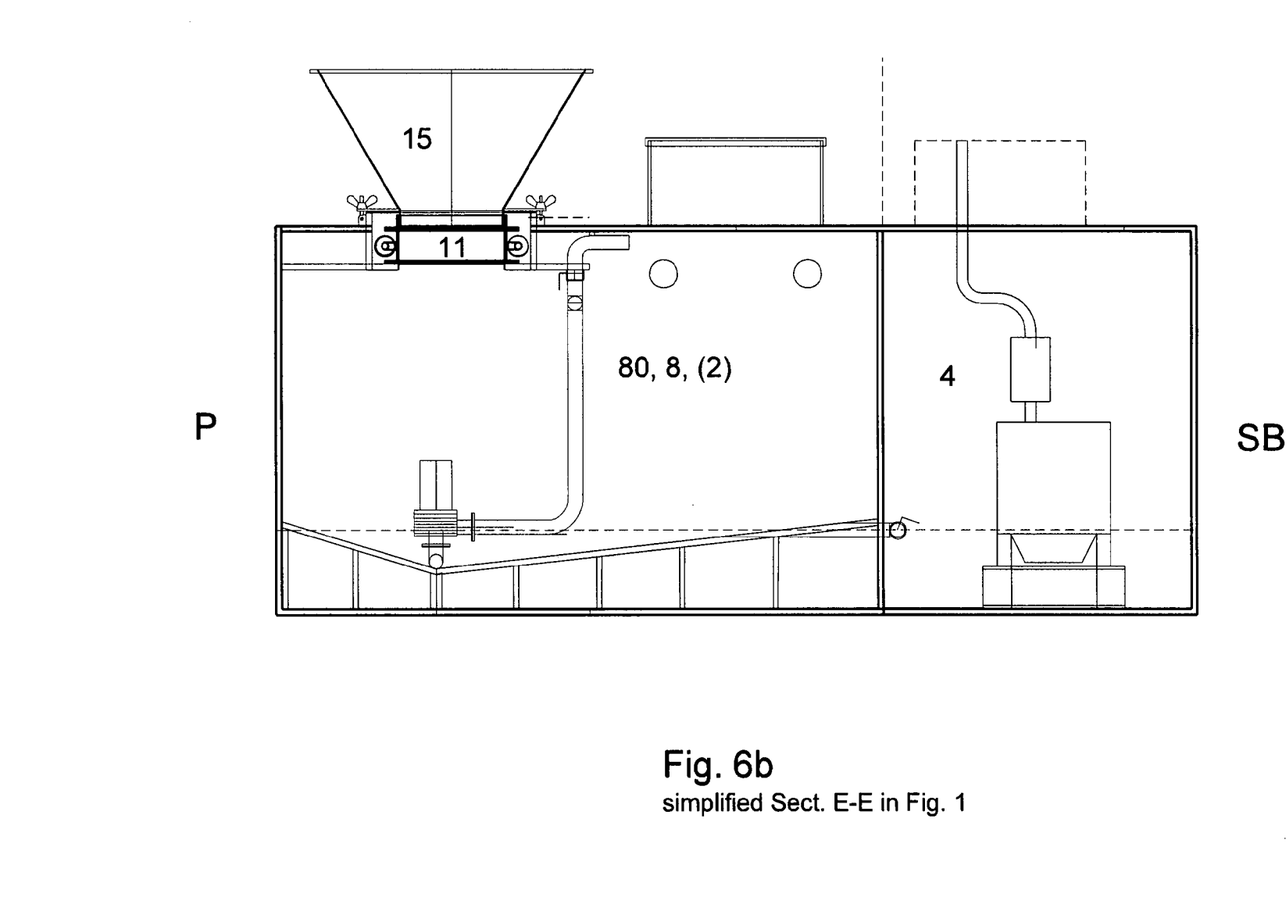
FIG. 6b shows a simplified cross section and partial elevation view along the line E-E from FIG. 1 and shown from aft showing the electrical generator room on the starboard, the absence of any ensiling tank in the centre and the funnel above the grinder and the grinding tank, together with a dry access pump for circulation and further pumping. In such a case, the dry access pump may also be used for pumping ground fish mass which has been ensiled further to storage tanks.

Such a simple embodiment of the invention is illustrated in FIG. 6b which is a simplified section of E-E in FIG. 1, in which the grinder tank (80) is used without any ensiling tank (2), please see FIG. 6.

Figure 3:
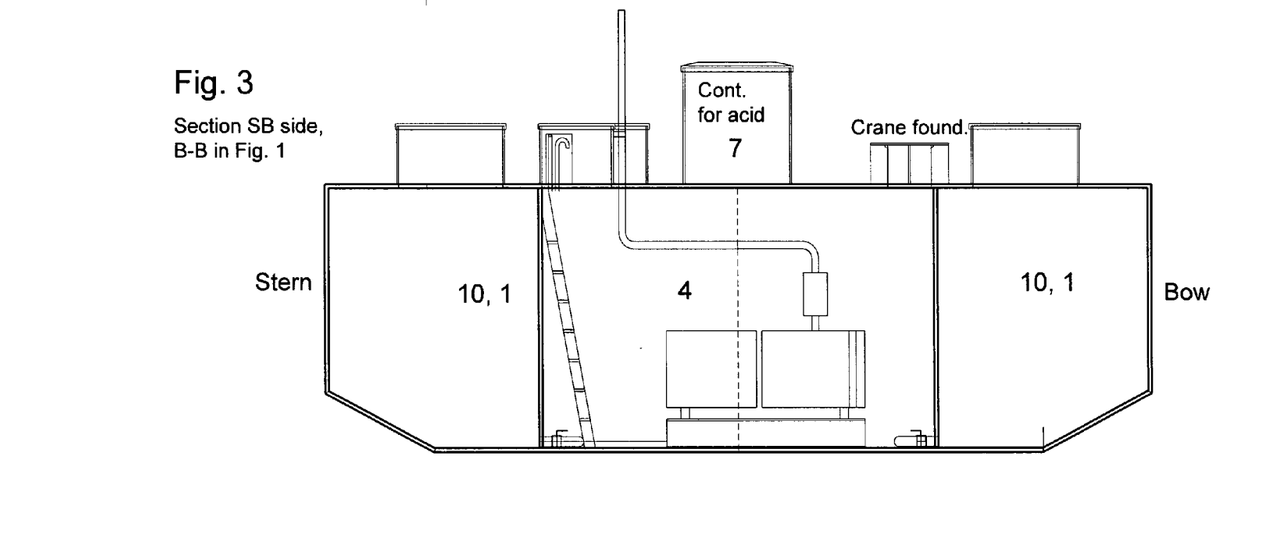
FIG. 3 shows a longitudinal section view along a line B-B in FIG. 1, of the starboard side of an the embodiment of the vessel according to the invention and shown from starboard side, with storage tanks, electrical generator room, acid tank on the deck, together with hatches and a crane foundation for supporting a crane for loading equipment.
Figure 5:
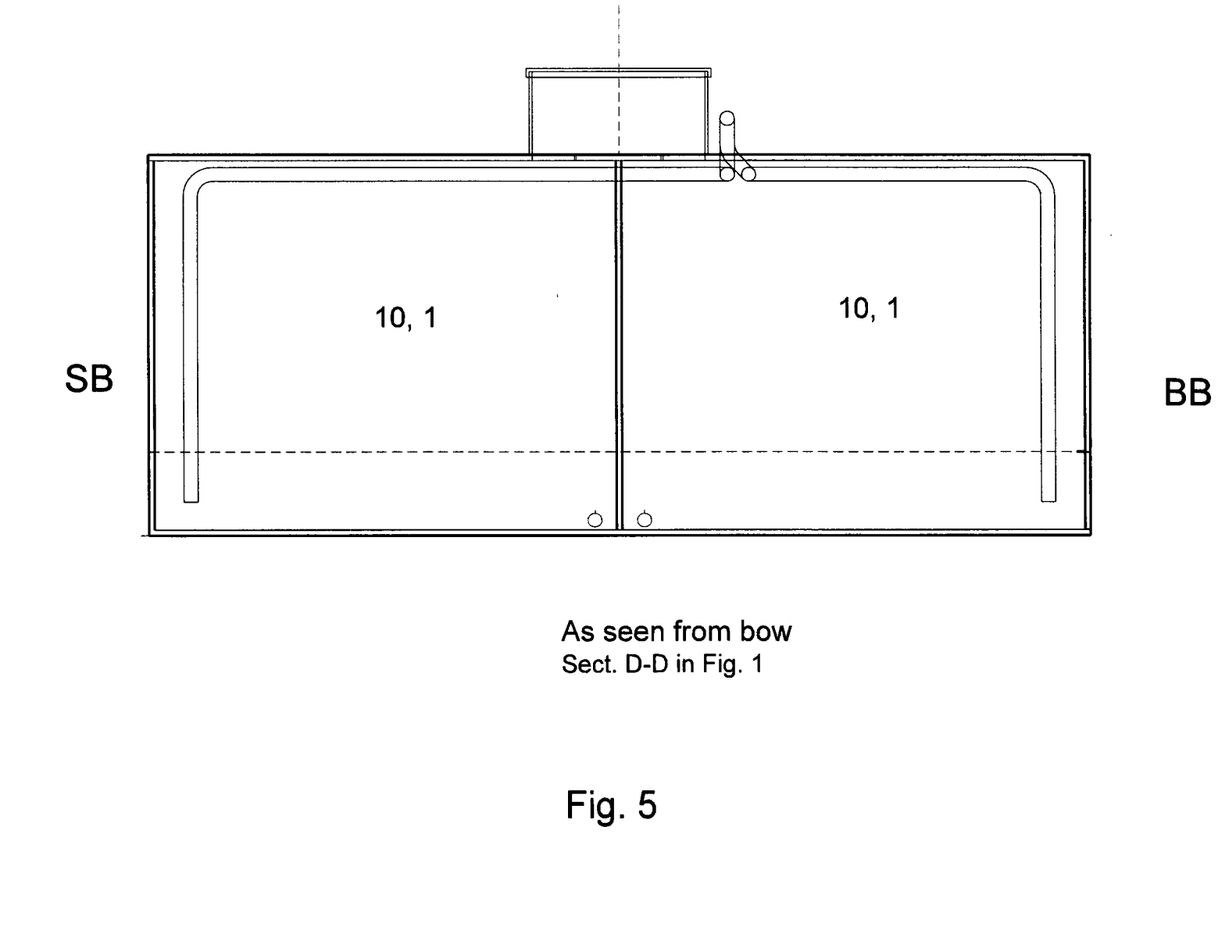
FIG. 5 shows an end section in the bow along cross the line D-D from FIG. 1. The section shows storage tanks together with a part of the pumping pipe work to and from tanks, and a hatch.

In a preferred embodiment of the invention the grinder tank (8) may be arranged for temporary storage of said ground fish mass, said grinder tank pump (13) further arranged for pumping said ground, mixed mass together with ensiling liquid over to an ensiling tank (2), please see FIGS. 1, 3 and 4.

The ground mass is led to the ensilation tank (2) from the grinder tank (8). This secures rapid addition of acid to the grinder tank (8) as well as the fact that one may readjust to a correct acid quantity to the ensilating tank (2), or even in the grinder tank (8) if desired or if having no ensiling tank as such, as illustrated in FIG. 6b. The circulation pump (13) in the grinder tank (8) may be run at the same time as the grinder (11) to secure agitation and intermixture of acid within a short time. The vessel according to the invention may be arranged for being directly connected to a system for pumping of dead fish directly from net cages to the funnel (15) on the vessel via a straining box for removal of pumping water. This may be of current interest in case of major disease outbreaks, due to the fact that it is urgently important that the dead fish is removed from the plant as soon as possible and using a minimum of manual handling. It is also possible to make use of fish counter equipment for securing a good data check of the biomass.

The vessel according to the invention has the advantage of having only an unidirectional inlet with the grinder (11) through in which the fish is ground immediately. The deck and the hull at least for the parts comprising the downstream part after the grinder (11) are generally closed so as for containing all parts of the ground fish mass. Thus the inlet in and around the funnel (15) together with affected parts of the deck may be disinfected immediately after grinding, and the risk of infection and spreading of the contagious disease is substantially reduced in comparison to more or less open and non-unidirectional ensilation equipment used in the prior art. When the dead fish is ground and mixed with the added ensilation liquid using the vessel of the present invention, one may expect that the contagious agents in the fish are killed off and no further risk of infection from the ensiled mass exists. Due to the uni-directionality of the process in the vessel according to the invention, no mass may be removed from the vessel unless it has passed through the grinder tank (8) and at least one ensilation process in the ensilation tank (2) or both in the grinder tank (8) and in the ensilation tank (2). In a preferred embodiment of the invention the mass is also passed through the storage tanks (1). The grinder tank (8) may be arranged in a grinder tank compartment (80). Further, the storage tank (1) may be arranged or be constituted by a storage tank compartment (10), and the ensiling tank (2) may be arranged or be constituted by an ensiling tank compartment (20), please see FIGS. 1, 2, and 4.

The vessel according to the invention comprises a floating hull designed for contained drift or freely moored or for being moored alongside a quay or by a fishing plant, such as by a net cage containing dead fish to be handled. The vessel is built with sufficient buoyancy and extra buoyancy in a way that it will not sink if the ensilation tank and the storage tanks are full. The vessel, here shown in the form of a barge according to the invention is designed to receiving, grinding, ensiling and storing dead fish from a fish farm. The vessel according to the invention subdivided into several separate chambers, of which several tanks (1) are for storage of finished ground and ensiled mass, ensilation tank (2) for mixing and after-treatment and after-dosing of ensilage acid, pumping room/ grinder compartment (8) with grinder (11), electrical generator room (4) with space for diesel-powered electrical generator- or hydraulic pump.

Figure 8:
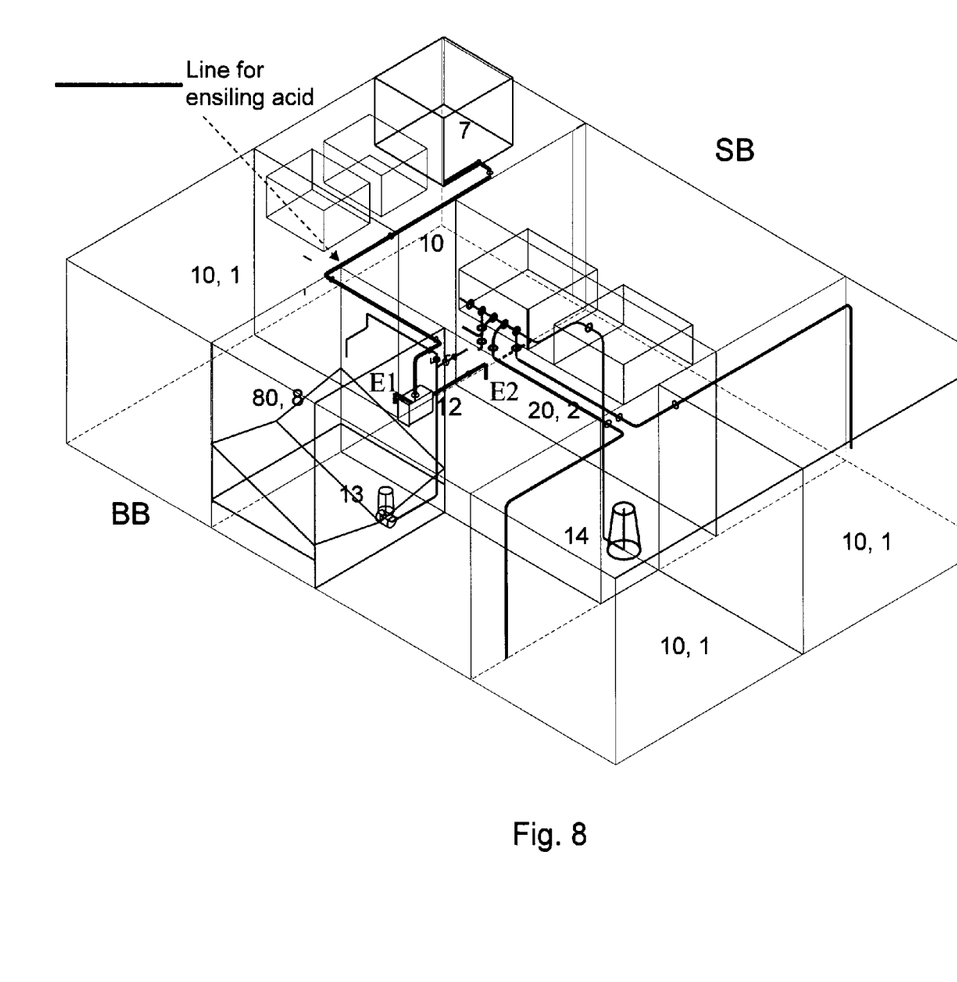
FIG. 8 is an isometric wire draft shown in the same way as FIG. 7, and shows tanks for ensiling liquid together with the device and the pipe work for ensiling liquid.

The vessel according to the invention also has a range of minor tanks such as for fuel oil, for fresh water, for chemicals such as formic acid (please see FIG. 8) and grinder tank (8) for ground mass and for adding ensiling acid.

Figure 7:
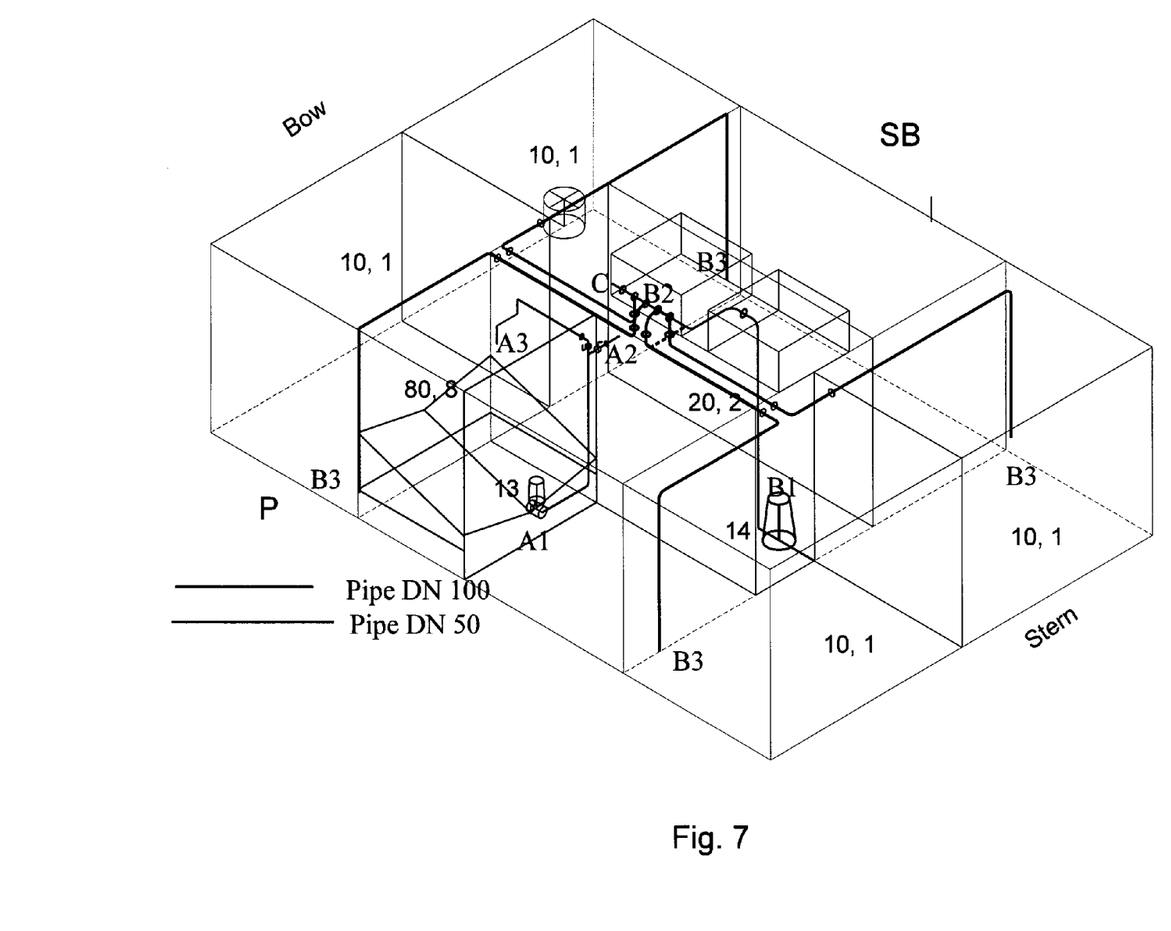
FIG. 7 showing an isometric wire draft shown from above and abaft the port side showing pipe work for pumps for internal circulation and transport between rooms and tanks.

The vessel according to the invention has a grinder (11) for grinding of dead fish, a relatively slow running so-called "muncher" grinding the fish to small pieces. The grinder (11) is particularly arranged for grinding and milling the fish. A separate chemical dosing plant (12) doses formic acid proportional to the amount of fish in the grinder tank (8). Dosing of the formic acid may be carried out manually or automatically. A dry access submerged pump (13) arranged near the lower end of an angular funnel shape bottom in the grinder tank (8). The pump (13) is arranged for circulating the mass in the grinder tank (8), and the same pump (13) may be used for pumping the provisionally acid added ground mass forward to the ensilage tank (2), please see FIG. 7. The same drawing shows that the ensilation tank (2) has a powerful grinder pump (14) arranged to stirring the ground mass in the ensilation tank and for pumping the ground mass further to the storage tanks (1).

Measuring of the pH in the ensilation tank (2) indicates whether there is a need for further addition of acid. If the pH-measurements are of satisfaction the ground and ensiled mass may be pumped further out to the storage tanks (1) by means of grinder pump (14) after a manual adjustment. If the measurements show a too high pH-value more acid is added, and the mass is mixed thoroughly before new samples are taken until one has reached a desired pH, preferably 3.8. The ensiled mass is pumped through a pipe plant with valves, please see FIG. 7. From the outlet A1 by the pump (13) in the grinding tank (8) the mass may circulate back to the same tank via the outlet A3, or may be pumped to the outlet A2.

The grinding pump (14) in the ensiling tank (2) also serves an extra function as a backup grinder. If the inlet grinder (11) fails the grinder pump (14) will temporarily grind the dead fish in the same way as otherwise done in most of fish farms today. Such a way of grinding may act as an improvised solution, but it would require much more pumping energy than what would be used using the grinder (11) already at the inlet funnel (15) because one would have to let the whole mass run through the grinding pump (14) several times to make sure that the whole mass has passed the grinder pump (14) because the circulation is not a forced convection but random, in the same way as tanks with the grinder pump in the background art.

The vessel according to an embodiment of the invention also has an important function as washing station for all equipment, boats and crew participating in collecting and ensiling of the dead fish, as it may equipped with a high-pressure washer and a steam cleaning system.

The vessel according to the invention is preferably made of a material not being affected chemically of finished ensiled mass having pH at 3.8. Thus the parts of the vessel exposed to the biological and acid matter should be built in stainless steel or fibre reinforced polymer material. Further the vessel is arranged for being located at sea at exposed locations which are frequently under influence of harsh weather conditions.

The vessel according to the invention may be moored at an easily accessible location near the fish farm, but it may also be mobile and transportable and as such constituting an emergency preparedness against infectious outbreak.

The vessel according to the invention should as far as possible be self-contained with its own power supply and preferably its own crane as shown in the FIG. 4, so as it to a lesser degree will occupy other operating equipment. But the vessel may also be arranged for using electric power from a land grid or from an external power source if available, both of consideration to reducing the loss of energy and for reducing contamination.

The vessel, here in the form of a barge according to the invention is subdivided in chambers, of which tank (1) is arranged for storage of finished ground and ensiled mass, so-called ensilage. Ensilation tank (2) with grinder pump (14) is placed centrally on the vessel for mixing and post mixing and post dosing of ensilation acid. The pumping room/grinding room (3) provides access to the grinder tank (8) with the dry access circulation pump (13), control valves for the circulation pump (13), and the fresh water tank. The generator room (4) has a electric power supply unit and has access to fuel oil tanks (5), and accommodates for hydraulic and electrical components. The float has a range of minor tanks such as fuel oil tank (5), the fresh water tank (6), the formic acid tank (7), and the somewhat larger grinder tank (5) for ground mass and for the first main addition of ensilation acid.

The grinder (11) is arranged directly at the main inlet beneath the funnel (15) for receiving the dead fish, and directly over the grinder tank (8) arranged for being the first recipient of the ground fish mass and for addition of acid. The grinder (11) is in a preferred embodiment made in stainless steel and corrosion resistive components for grinding of the dead fish, and grinds the fish into small pieces in order to achieve a large total exposed surface for rapid absorption of acid. A separate chemical dosing plant (12) doses formic acid proportional to the amount of fish in the grinder tank. The pump (13) is used for circulation of the ground mass in the grinder tank, and the same pump (13) is utilized for pumping the initially ensiled mass further to the ensilation tank (2). The ensilation tank (2) has a powerful grinder pump (14) which may be used for mixing in the tank and for pumping further to the storage tank (1). In an embodiment of the invention the partition wall or tank wall between the grinder tank and the ensilation tank may be omitted so as for the ensilation tank (2) with all its equipment such as pumps, valves, sensors and pipes may form an integral, non-separable part of the grinder tank (8). This is illustrated in FIG. 6b. This is particularly valid if the design size of the vessel is reduced from about 100 tonnes to about 60 tonnes.

pH measurements of the samples from the ensilation tank (2) are used to determine whether there is a need for adding additional acid. If the pH-measurements are of satisfactory the mass may be pumped further out to the storage tanks (1) by means of the same grinder pump (14) after a manual switch-over of the valves in a manifold. If the measurements show a too high pH-value more acid is added and the mass is mixed by a additional running of the grinder pump (14) before new samples are taken and measured until one has achieved a pH at 3.8.

The grinder pump (14) also serves the function of a backup grinder, because in case the grinder (11) is put out of function the grinder pump (14) may function as a grinder and grind the dead fish in the same way as is done in the most of fish farms today. The vessel is equipped with pipes and valves which make it possible to pump ready ensiled mass to one of four desired storage tanks (1) from grinder pump (14) for storing, uniform distribution of the mass and in addition for trimming of the floating device. There is also arranged pipes and valves for circulation of mass between tanks for trimming and avoiding sedimentation of mass, please see FIG. 7. A control system for all pumps and valves are centrally arranged on the vessel for being easily accessible so as all the vessels processes including the grinding and ensilation process may be controlled from that place.

The dosing plant (12) may in an embodiment of the invention be arranged to dose formic acid proportional to the amount of ground fish in the grinder tank. The dosing plant (12) may in an embodiment of the invention be equipped with a programmable logical system (PLS)-controller and arranged to co-operate with the grinder, and may also have sensors for measuring pH values in the ensilation tank. Based on the technical experience the plant may dose a correct amount of formic acid into the mass in order to adjust the pH-value of the mass to right pH-values in the ensilation tank (2) or in the grinder tank (8) before ensilage is pumped further to the storage tank. The chemical dosing plant has built-in latch and alarm systems to avoid incorrect dosing as a consequence of erroneous signals from sensors.

The grinding and ensiling vessel according to the invention may in a simplified embodiment of invention made without storage tank for direct pumping from ensilation tank (2) to external storage tanks (1).

The invention claimed is:

1. A vessel for handling of contagious or dead fish comprising:
   a hull with a generally closed deck; and
   an inlet for receiving said fish to a fish grinder arranged for grinding said fish through said grinder and arranged for delivering ground fish mass to a closed, internal grinder tank in said vessel,
   wherein said grinder tank is arranged for receiving ensiling liquid from a chemical dosing plant to said ground fish mass, and
   wherein said inlet is constituted by a funnel on the deck, said funnel arranged for receiving dead fish and conducting said dead fish through said grinder.

2. The vessel according to claim 1, wherein said dosing plant is arranged for dosing ensiling liquid into the ground mass proportional to the amount of fish supplied to the grinder tank.

3. The vessel of claim 1, further comprising a grinder tank pump for circulating said ground mass in said grinder tank.

4. The vessel of claim 3, wherein said grinder tank is arranged for temporary storage of said ground fish mass, said grinder tank pump further arranged for pumping said ground, mixed mass together with ensiling liquid over to an ensiling tank.

5. The vessel of claim 4, wherein said chemical dosing plant is arranged for adding additional ensiling liquid to said ground fish mass, said ensiling tank or to said grinder tank in order to adjust said ground fish mass to a desired acidity based on measurements of acidity in said ground fish mass.

6. The vessel of claim 4, wherein said ensiling tank is provided with an ensiling tank pump for circulation of said ground mass in said ensiling tank and for export from said ensiling tank to one or more storage tanks or to the outside of the vessel.

7. The vessel of claim 5, wherein said ensiling tank is provided with an ensiling tank pump arranged for pumping said mixed, acidity adjusted mass further to one or more storage tanks on board said vessel.

8. The vessel of claim 1, wherein said hull is subdivided into two or more bulkhead compartments.

9. The vessel of claim 8, wherein one or more of the bulkhead compartments comprises said grinder tank.

10. The vessel of claim 8, wherein one or more of said bulkhead compartments comprises said ensiling tank.

11. The vessel of claim 1, said chemical dosing plant for initially providing a roughly estimated addition of ensiling liquid to said ground mass.

12. A method for handling contagious or dead fish, comprising the steps of:
    feeding said fish from an external source through an inlet in a vessel to a grinder for grinding said fish to a ground fish mass and delivering said ground fish mass to a closed, internal grinder tank in said vessel;
    feeding ensiling liquid from a chemical dosing plant to said ground fish mass in said grinder tank so as to form a ground and ensiled fish mass;
    circulating said ground mass in said grinder tank using a grinder tank pump;
    storing temporarily said ground fish mass in said grinder tank, and pumping said ground, mixed fish mass together with said ensiling liquid over to an ensiling tank by means of said grinder tank pump; and
    making measurements of acidity of said ground fish mass in said ensiling tank or said grinder tank and using said chemical dosing plant for adding additional ensiling liquid to said ground fish mass in said ensiling tank or said grinder tank in order to adjust said ground fish mass to a desired acidity.

13. The method of to claim 12, further comprising the step of during the grinding process, said dosing plant dosing ensiling liquid into said ground mass in amounts proportional to the amount of fish supplied to the grinder tank.

14. The method of claim 12, further comprising the steps of circulating said ground mass in said ensiling tank using an ensiling tank pump and exporting said ground mass from said ensiling tank to one or more storage tanks or to outside of the vessel.

* * * * *